Nov. 11, 1952  R. D. UNDERWOOD  2,617,367
TRUCK SAFETY HOOK
Filed Aug. 21, 1948

Inventor
Roger D. Underwood
By
Spencer, Willits, Helwig & Baillio
Attorneys

Patented Nov. 11, 1952

2,617,367

UNITED STATES PATENT OFFICE 2,617,367

TRUCK SAFETY HOOK

Roger D. Underwood, Western Springs, Ill., assignor to General Motors Corporation, Detroit, Mich., a corporation of Delaware Application August 21, 1948, Serial No. 45,447

6 Claims. (Cl. 105—200)

This invention relates to railway vehicles and more particularly to connections between the trucks and bodies of such vehicles.

In addition to the usual pivotal connections between the body and trucks to permit pivotal movement of the trucks relative to the body in normal operation on curved track, safety connecting means are usually provided to limit the pivotal movement and to prevent separation of the trucks from the body in cases of derailment. The limited space available for these safety means, especially between multi-axle traction trucks and the body or cab of locomotives on account of the additional traction and braking equipment on the trucks and power equipment in the body or cab limits the size of these safety means and the impact stress which they must withstand upon derailment of the trucks. It is also necessary to insure that these safety means be securely locked in operative relation but readily disconnectible to permit disassembly of the trucks from the body for repairs and inspection of the truck assembly.

The principal object of the present invention is to provide connecting means between the body and trucks of a railway vehicle to permit normal pivotal movement of the trucks relative to the body and to limit pivotal movement of and to prevent separation of the trucks from the body upon derailment of the trucks but readily disconnectible to permit removal of the trucks for servicing.

The combination of means by which this object is accomplished and other advantages provided thereby will become apparent by reference to the following description and drawings illustrating this combination.

Figure 1 of the drawings is a vertical elevation view of a portion of one end of a railway vehicle body and a multi-axle truck upon which it is pivotally supported and interlocked therewith but capable of being readily disconnected.

Figure 1:
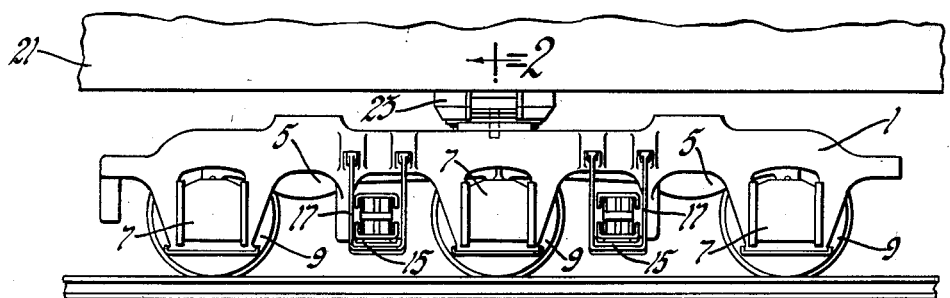
Figure 2:
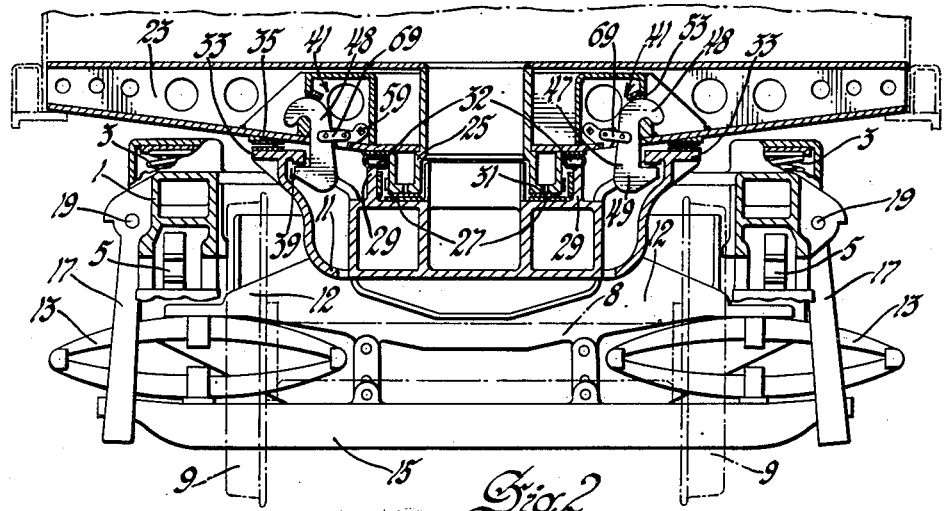
Figure 2 is an enlarged cross sectional elevation view taken on line 2—2 of Figure 1 with parts broken away, and shown in section and in dotted outline.

As illustrated in Figures 1 and 2 a railway truck having a frame 1 is supported by means of helical springs 3, equalizer bars 5 and journal boxes 7 on three axles 8 having wheels 9 secured thereto. The truck is provided with a hollow cast bolster 11 extending longitudinally above the center truck axle and having end portions 12 extending transversely between transom portions and below the sides of the truck frame and supported on leaf springs 13 resting on a transverse spring plank 15 suspended at the ends by swinging links 17 pivoted at the upper end to opposite sides of the frame 1 between the center and each of the end truck axles 8 by pins 19, as best shown in Figure 2.

A vehicle body 21 having an underframe provided with hollow bolsters 23 each of welded construction and having a centrally located downwardly projecting center plate 25 of hollow annular form is supported on the trucks 1. As best shown in Figure 2, each of the body bolster center plates 25 are supported on a central annular seat portion 27 of the truck bolster 11 and within an upstanding annular flange 29 of the truck bolster 11 to form a hollow center plate portion, generally indicated by the character reference 31. Suitable wear plates of annular and hollow cylindrical form are provided between the adjacent surfaces of the body and truck center plates 25—31. The hollow body center plate contains lubricant which flows by gravity through suitable holes therein between these wear plates and a hollow toroidal rubber seal 32 is provided between the upper face of the annular flange 29 of the truck bolster and adjacent lower face of the body bolster center plate 25 to which it is vulcanized. The hollow annular center plates 25—31 serve as an air pressure cooling duct connection for the traction motors of the truck in which case the seal 32 prevents air leakage. The seal, however, may serve as a dust seal if the trucks are not provided with motors.

Figure 3:
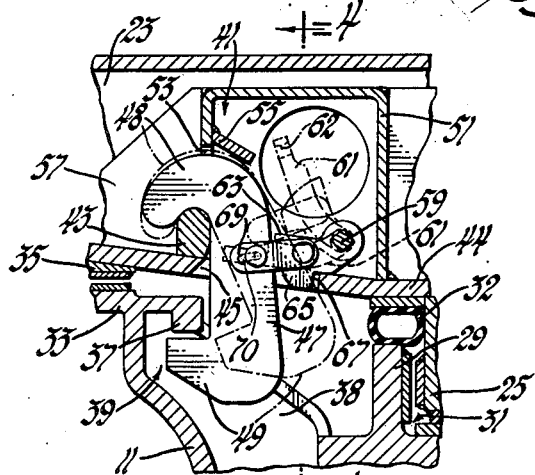
Figure 3 is an enlarged view of a portion of Figure 2 with parts broken away and in section and in dotted lines to show certain parts in interlocking and disconnected relations.

The truck and body bolsters 11—23 are provided with cooperating side bearing portions 33—35 which are also shown provided with wear plates. As best shown in Figures 2 and 3, a retaining flange portion 37 of the truck bolster 11 extends radially inwardly from each side bearing portion 33 and longitudinally spaced gusset portions 38 of the truck bolster extend vertically downward from the ends of the retaining flange portions 37 to form inwardly opening pockets, generally indicated at 39, adjacent the side bearing portions.

The body bolster 23 includes the following attachments to form pockets, generally indicated at 41, having openings extending outwardly and downwardly therefrom.

As best illustrated in Figure 3, a bolster retaining lug 43 is secured to the upper face of the lower flange 44 of the body bolster 23 at a point immediately above the horizontal retaining flange 37 of the pockets 39 in the truck bolster 11 and an opening 45 is provided in the lower flange 41 of the body bolster inside the point of attachment of the retaining lug 37.

A safety retaining hook 47 is inserted upwardly through the lower body bolster opening 45 and the upper curved hooked portion 48 thereof is hooked over the upper curved surface of the retaining lug 43 on the body bolster 23 and the lower right angular hooked portion 49 of this hook normally hangs by gravity within the pocket 39 and is spaced slightly below the truck bolster retaining flange 37 and between the vertical gussets 38 at the ends of this flange, as shown in full lines in Figures 3 and 4. When the safety retaining hooks 47 are in this operative retaining position it will be evident that the safety hooks will permit only slight relative vertical movement of the truck and body bolsters 11 and 23. This limited relative vertical movement retains the bolster center plates 25—31 in overlapping relation.

The upper part of the pocket 41 in the body bolster is formed by the following structure to prevent upward vertical movement to the hooks 47 and accidental disengagement of the upper curved hooked portions 48 from the upper curved surfaces of the retaining lugs 43 in the body bolster 23 and to allow only transverse inward swinging movement of the hooks 47 on these lugs and only slight vertical and longitudinal movement with respect thereto. An inverted U shaped channel member 51 is secured to the sides and lower flange 44 of the body bolster 23 above each of the openings 45 therein. The outer side flange of each of the channel members 51 is also secured to the retaining lug 43 and an opening 53 is provided in this flange above the lug of just sufficient size to permit insertion of the upper hooked end 48 of the hook 47 therethrough for engagement with the retaining lug 43. A hook retaining member 55 is secured adjacent the upper edge of the chanel opening 53 to the inner face of the outer flange of the channel 51 and extends inwardly and downwardly into the pocket 41. The hook retaining member 55 and upper edge of the opening 53 in the channel limits upward movement of the safety hook 47 to prevent accidental unhooking thereof and also serves as a bearing for the upper hooked portion 48 of the safety hook to permit inward swinging movement thereof so that its lower hook portion 49 swings inwardly and out from under the truck bolster retaining flange 37 of the pocket 39 in the truck bolster 11 to a retracted position, shown in dotted lines in Figure 3, to permit vertical separation of the truck and body bolsters 11—23.

Figure 4:
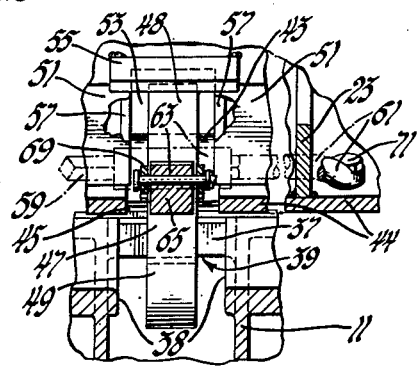
Figure 4 is a longitudinal sectional view taken on line 4—4 of Figure 3.

As best shown in Figures 3 and 4, vertical strengthening gussets 57 are secured to the outer face of the body bolster channels 51 flush with the sides of the openings 53 therein and also to the lug 43 and lower flange 44 of the body bolster 23.

It will be apparent that with the safety hooks 47 in the operative full line retaining position, as shown in Figures 3 and 4, the sides of the channel openings 53 and inner faces of the gussets 57 flush therewith serve as body bolster stops to limit longitudinal relative movement of the upper ends 48 of the hooks 47 projecting therebetween upon contact of the longitudinally spaced gussets 38 of the truck bolster 11, also serving as limit stops, with the lower end 49 of the hooks, upon a predetermined pivotal movement in either direction of the truck bolsters with respect to the body bolsters 23. The safety retaining hooks 47 connecting the truck and body bolsters and the above bolster stops accordingly also cooperate to limit a predetermined pivotal movement of the truck bolsters 11 with respect to the body bolsters 23 in case of derailment of the truck wheels 9.

The safety hooks 47 may be manually swung to the operative retaining position and wedged in this position or swung inwardly to the retracted position by separate operating rods 59 each rotatable about a longitudinal axis in the body bolster 23 within each of the pockets 41 therein and provided with a bent end handle portion 61 positioned at one side and parallel to the body bolster and having a hole 62 in the end, as best illustrated in Figures 3 and 4. A wedge 63 is secured on the operating rod 59 in back of the safety hook 47. The wedge 63 has an outer wedging surfaces 65 and a notch 67 serving as a stop adjacent the lower end of this surface. A lost motion link 69 is connected between the safety hook 47 and wedge 63.

The link 69 is shown in Figure 3 pivotally connected at the inner end to the wedge 65 by a pin and another pin secured to the safety hook 43 extends through a slot 70 in the outer end of the link 69.

Rotation of the operating rod 59 counterclockwise by means of its handle 61, as viewed in Figure 3, causes the wedging surface 65 of the wedge 63 to contact the back of the safety hook and swing it outwardly to its operative retaining position. The wedge 63 then blocks inward swinging movement of the hook 47 to the retracted position. As best illustrated in Figure 3 the wedge 63 is shown in full lines in the hook blocking position with the lower notch 67 of the wedging surface 65 in contact with the inner end of the opening 45 in the lower flange 44 of the body bolster and in engagement with the upper face of the body bolster flange 44 and the handle 61 of the operating rod 59, as best shown in Figure 4, is then in contact with the upper surface of the body bolster lower flange 44 projecting from one side of the body bolster. The weight of the wedge 63 and handle 61 of the operating rod 59 tends to hold the wedge 63 in blocking relation with respect to the hook 47. A locking stud 71 is shown in Figure 4 extending through the hole 62 in the operating rod handle 61 and threaded into an opening in the body bolster lower flange to retain the wedge 63 in blocking relation with the hook 47. Removal of this stud and clockwise movement of the operating rod handle 61 and wedge 63 causes the lost motion link 69 between the wedge 63 and hook 47 to swing the hook 47 to the retracted position. The above mechanism then assumes the dotted line position shown in Figure 3 so that vertical separation of the truck from the body may be accomplished.

The above described bolster connecting mechanism is compact and may be located directly between truck and body bolsters to prevent accidental separation of the truck from the body of a railway vehicle and also limits the pivotal movement of the trucks relative to the body of a railway vehicle upon accidental derailment of the truck wheels and includes conveniently located manual means for readily accomplishing separation of the trucks from the body for service and repairs.

I claim:

1. In combination, a vehicle body, a supporting truck therefor, said body and said truck having pivotally connected bolsters, hooks hung on projections on said body bolster and urged by gravity into engageable position with adjacent projections on said truck bolster to prevent vertical separation of said bolsters, and separate hook retaining and retracting link means operably connected to each hook and movably supported on one of said bolsters and normally urged by gravity into engagement with each of said hooks to retain said hooks in bolster engaging position.

2. In combination, a vehicle body, a supporting truck therefor, said body and said truck having interengaging bolsters for relative pivotal movement therebetween, safety hooks hung by gravity on projections of said body bolster in engageable position with adjacent projections on said truck bolster to prevent vertical separation of said bolsters, separate wedges pivoted on said body bolster and urged by gravity into engagement with each of said hooks to retain the hooks in bolster engaging position, manual means movably supported on one bolster and connected to said wedges for moving the wedges out of engagement with said hooks and a lost motion link means interconnecting said hooks and said wedges for moving the hooks on said body bolster projection out of engageable relation with said truck bolster projection.

3. In combination, a vehicle body, a supporting truck therefor, said body and said truck having central interengaging portions permitting relative pivotal movement therebetween, said bolsters having vertically spaced horizontally extending projections and vertically extending end portions either side of the interengaging portions, safety hooks hung on the horizontal projections of said body bolster in engageable position with the horizontal projection of said truck bolsters to limit relative vertical separation between said bolsters, the sides of said hooks being contactable with the end portions of these projections to limit relative pivotal movement between said bolsters, separate manually operable hook retaining and retracting link means movably supported on one of said bolsters and connected to said hooks for gravity engagement therewith for normally retaining said hooks in the engageable position manually movable for retracting said hooks to a disengaged position with respect to said truck bolster, and means for locking said manually operable means in the hook retaining position.

4. In combination, a truck, a vehicle body pivoted on said truck and having hooks hanging downwardly therefrom either side of the pivotal connection of said body and said truck in position to engage projections of said truck to prevent separation of said body and truck, manually operable hook retaining and retracting means pivotally mounted on said body and normally urged by gravity into contact with said hooks to retain said hooks in engaged position, and connecting means interconnecting the hooks and hook retaining and retracting means for retracting said hooks out of engageable position upon operation of the manually operable hook retaining and retracting means.

5. In combination a truck having a hollow bolster provided with a hollow center plate portion, side bearing portions and pocket portions extending downwardly and outwardly below said side bearing portions, a body having a hollow bolster provided with a hollow center plate portion and side bearing portions cooperating with said center plate and side bearing portions of said truck bolster to permit pivotal movement between said truck and said body bolsters, said body bolster having lower openings above the pocket portions of said truck bolster and means secured in said body bolster above each opening therein and forming pockets with outwardly facing side openings, a hook hung in each of the side openings and extending downwardly through each of the lower openings in said body bolster in position to engage the upper portion of each pocket in said truck bolster upon relative vertical movement of said bolsters and to engage the sides of the pockets in said truck bolster to limit relative pivotal movement between said bolsters, separate hook retaining and retracting means including wedge means pivoted on said body bolster and normally urged by gravity to retain the wedge means in wedging contact with each hook to retain the hook in bolster engaging relation and connected by a lost motion connection with each hook for swinging the lower end of each hook to a retracted position out of engageable relation with the upper portion of the pocket portions of said truck bolster and means for locking said hook retaining and retracting means on said body bolster with the wedging means in wedging relation with the hook.

6. In combination, a vehicle body bolster having pockets disposed inwardly of the ends, a hook suspended in the side of each pocket and extending downwardly therefrom, a truck pivotally supporting the body bolster and having projections engageable by the hooks to limit relative vertical and pivotal movement of the truck and bolster, manually operable hook engaging means rotatably supported on the bolster and urged by gravity into engagement with the hooks to retain the hooks in engageable relation with the projections on the truck, locking means detachably secured to the bolster and engaging the manually operable means when engaged with the hooks, and link means interconnecting the manually operable means with the hooks for moving the hooks out of engageable relation with the lugs on the truck to permit vertical separation of the truck and body bolster.

ROGER D. UNDERWOOD.

REFERENCES CITED

The following references are of record in the file of this patent:

UNITED STATES PATENTS

| Number | Name | Date |
| --- | --- | --- |
| 2,128,281 | Blomberg | Aug. 30, 1938 |